(12) United States Patent
Yamamoto et al.

(10) Patent No.: US 10,718,741 B2
(45) Date of Patent: Jul. 21, 2020

(54) ULTRASONIC FLAW DETECTING APPARATUS, ULTRASONIC FLAW DETECTING METHOD, AND MANUFACTURING METHOD OF PRODUCT

(71) Applicants: KABUSHIKI KAISHA TOSHIBA, Minato-Ku (JP); Toshiba Energy Systems & Solutions Corporation, Kawasaki-Shi (JP)

(72) Inventors: Setsu Yamamoto, Yokohama (JP); Azusa Sugawara, Kawasaki (JP); Jun Semboshi, Yokohama (JP); Kentaro Tsuchihashi, Yokohama (JP); Takeshi Hoshi, Yokohama (JP); Masaru Otsuka, Ota (JP)

(73) Assignees: KABUSHIKI KAISHA TOSHIBA, Minato-ku (JP); Toshiba Energy Systems & Solutions Corporation, Kawasaki-Shi (JP)

( * ) Notice: Subject to any disclaimer, the term of this patent is extended or adjusted under 35 U.S.C. 154(b) by 169 days.

(21) Appl. No.: 15/934,230

(22) Filed: Mar. 23, 2018

(65) Prior Publication Data
US 2019/0170701 A1    Jun. 6, 2019

(30) Foreign Application Priority Data
Apr. 3, 2017   (JP) .................................. 2017-073660

(51) Int. Cl.
*G01N 29/04*     (2006.01)
*G01N 29/26*     (2006.01)
(Continued)

(52) U.S. Cl.
CPC ....... *G01N 29/262* (2013.01); *G01N 29/2437* (2013.01); *G01N 29/2456* (2013.01);
(Continued)

(58) Field of Classification Search
CPC .............. G01N 29/2456; G01N 29/262; G01S 15/8909; G01S 15/8927; G10K 11/26; G10K 11/34; G10K 11/341; G10K 11/346
See application file for complete search history.

(56) References Cited

U.S. PATENT DOCUMENTS

| 5,419,330 A | 5/1995 | Nishigaki et al. |
| 2006/0052703 A1 | 3/2006 | Kumazawa |

(Continued)

FOREIGN PATENT DOCUMENTS

| JP | 3094742 | 10/2000 |
| JP | 2011-2360 | 1/2011 |

(Continued)

*Primary Examiner* — Herbert K Roberts
(74) *Attorney, Agent, or Firm* — Oblon, McClelland, Maier & Neustadt, L.L.P.

(57) ABSTRACT

An ultrasonic flaw detecting apparatus comprises an array prove, an element-group defining circuit, a calculator, a signal receiver and a generator. The array probe comprises a plurality of piezoelectric elements, each of the plurality of piezoelectric elements being configured to transmit and receive an ultrasonic wave to and from an inspection object. The element-group defining circuit is configured to select, as an element group, plural consecutive piezoelectric elements from the plurality of piezoelectric elements, set a reference position of the element group based on array arrangement information of the plurality of piezoelectric elements in the element group and based on a weighting value of each of the plurality of piezoelectric elements in the element group, and calculate a propagation path of an ultrasonic beam from the element group based on the reference position and a predetermined refraction angle. The calculator is configured to calculate a delay time of each of the plurality of piezoelectric elements in the element group in such a manner that the ultrasonic beam is configured to propagate along the propagation path. The signal receiver is configured to receive (Continued)

respective ultrasonic waves received with the plurality of piezoelectric elements as detection signals. The generator is configured to generate at least one composite signal for the ultrasonic beam having the propagation path based on the detection signal and the delay time.

7 Claims, 9 Drawing Sheets

(51) Int. Cl.
*G10K 11/34* (2006.01)
*G01S 15/89* (2006.01)
*G01N 29/24* (2006.01)
*G01S 7/52* (2006.01)

(52) U.S. Cl.
CPC ...... *G01N 29/2468* (2013.01); *G01S 15/8915* (2013.01); *G01S 15/8927* (2013.01); *G10K 11/346* (2013.01); *G01N 2291/106* (2013.01); *G01S 7/52047* (2013.01)

(56) References Cited

U.S. PATENT DOCUMENTS

| | | | |
|---|---|---|---|
| 2006/0219013 A1 | 10/2006 | Baba et al. | |
| 2009/0078742 A1* | 3/2009 | Pasquali | G01N 29/225 228/103 |
| 2011/0265570 A1 | 11/2011 | Kumazawa | |
| 2013/0197824 A1* | 8/2013 | Baba | G01N 29/07 702/39 |

FOREIGN PATENT DOCUMENTS

| | | |
|---|---|---|
| JP | 4690831 | 6/2011 |
| JP | 5355660 | 11/2013 |
| JP | 2013-242162 | 12/2013 |
| JP | 5565904 | 8/2014 |
| JP | 2016-161423 | 9/2016 |
| KR | 10-1627821 B1 | 6/2016 |

* cited by examiner

DRIVE DELAY TIME

RECEPTION DELAY TIME

ULTRASONIC FLAW DETECTING APPARATUS, ULTRASONIC FLAW DETECTING METHOD, AND MANUFACTURING METHOD OF PRODUCT

CROSS-REFERENCE TO RELATED APPLICATION

This application claims the benefit of priority of Japanese Patent Application No. 2017-073660, filed Apr. 3, 2017, the entire contents of which are incorporated herein by reference.

FIELD

Embodiments of the present invention relate to a phased array type ultrasonic flaw detection technique and a method of manufacturing a product using the ultrasonic flaw detection technique.

BACKGROUND

An ultrasonic flaw detection test is an inspection technology that can nondestructively inspect soundness of a surface and interior of a structural material or the like to be used as a product, and the ultrasonic flaw detection test is used in various fields.

A phased array-type ultrasonic flaw detection test is performed in such a manner that an array probe constituted by arraying plural compact piezoelectric elements for transmitting and receiving ultrasonic waves is directly or indirectly brought into contact with an inspection object. By driving the plural arrayed piezoelectric elements at different timings, ultrasonic waves can be internally transmitted from the array probe to the inspection object at an arbitrary angle.

For this reason, the phased array method can detect flaws in a wide range and multiple angles while fixing the array probe, as compared with the monocular probe method in which ultrasonic waves can be transmitted only at a predetermined angle. Thus, the phased array method for the ultrasonic flaw detection test is possible to target a structural material having a complicated shape and to reduce the number of working steps.

[Patent Document 1] Japanese Unexamined Patent Application Publication No. 2011-002360

For instance, when ultrasonic flaw detection is performed on an inspection object having coarsened crystal grain and/or anisotropy such as a welded portion, the frequency of an ultrasonic wave transmitted to the inside of the inspection object is sometimes set to a small frequency in order to reduce the influence of noise. In the case of transmitting a low-frequency ultrasonic wave to the inside of the inspection object by the phased array method, it is required to increase the size of each piezoelectric element constituting the array probe in order to secure the detection sensitivity of a flaw.

As one of the driving methods of the piezoelectric elements in the phased array method, there is known a linear scan method. In the linear scan method, the position of the beam line of the ultrasonic beam (i.e., the reference position or the incident position on the inspection object) is moved along the surface of the inspection object while the flaw detection direction (i.e., the direction of the ultrasonic beam, such as the refraction angle, transmitted to the inside of the inspection object) is being kept constant. In the case of executing this linear scanning method, the array pitch of the piezoelectric elements becomes large when the size of each piezoelectric element is increased. As a result, the interval of the ultrasonic beams discretely arranged according to the size of each piezoelectric element is expanded, and there is a problem that the spatial resolution of flaw detection is reduced.

When the size of each piezoelectric element is reduced in order to solve the above-described problem, it is necessary to simultaneously drive plural piezoelectric elements for securing detection sensitivity, which further leads to another problem that the control channels of the piezoelectric elements become enormous.

In view of the above-described problems, an object of embodiments of the present invention is to provide an ultrasonic flaw detection technique with improved spatial resolution of flaw detection and to provide a manufacturing method of a product based on this ultrasonic flaw detection technique.

DETAILED DESCRIPTION

Figure 1:
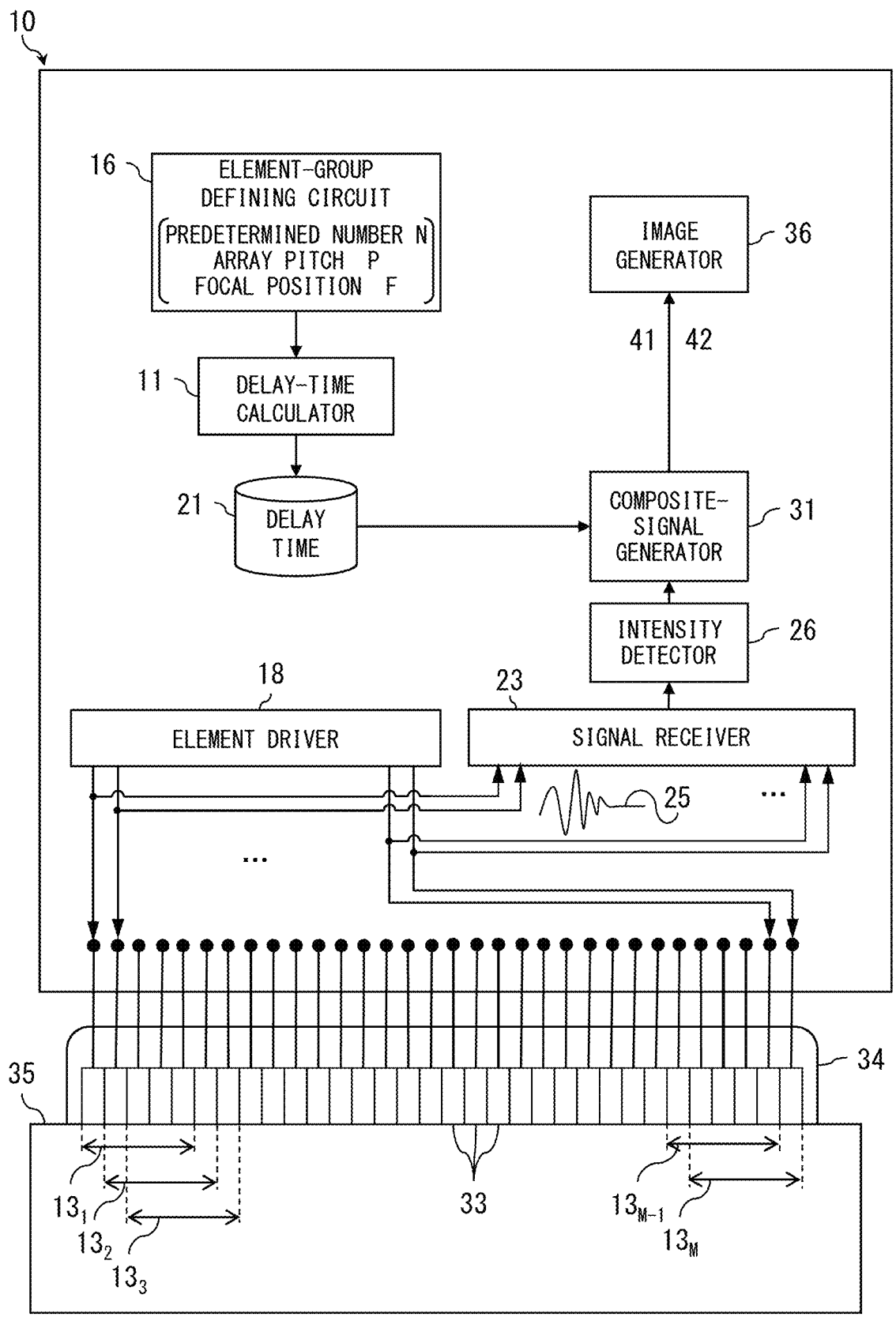
FIG. 1 is a block diagram illustrating an ultrasonic flaw detecting apparatus according to the first embodiment of the present invention.

Hereinafter, embodiments of the present invention is described by referring to the accompanying drawings.

Embodiments described hereinafter provide an ultrasonic flaw detecting apparatus comprising:
an array probe comprising a plurality of piezoelectric elements, each of the plurality of piezoelectric elements being configured to transmit and receive an ultrasonic wave to and from an inspection object;
an element-group defining circuit configured to
select, as an element group, plural consecutive piezoelectric elements from the plurality of piezoelectric elements,
set a reference position of the element group based on array arrangement information of the plurality of piezoelectric elements in the element group and based on a weighting value of each of the plurality of piezoelectric elements in the element group, and calculate a propagation path of an ultrasonic beam from the element group based on the reference position and a predetermined refraction angle;

a calculator configured to calculate a delay time of each of the plurality of piezoelectric elements in the element group in such a manner that the ultrasonic beam is configured to propagate along the propagation path;

a signal receiver configured to receive respective ultrasonic waves received with the plurality of piezoelectric elements as detection signals; and a generator configured to generate at least one composite signal for the ultrasonic beam having the propagation path based on the detection signals and the delay time.

Also, embodiments described hereinafter provide an ultrasonic flaw detecting method comprising:

selecting plural consecutive piezoelectric elements, which are selected from a plurality of piezoelectric elements constituting an array probe, as an element group;

setting a weighting value for each of the plurality of piezoelectric elements in the element group;

setting a reference position of the element group based on the weighting value and the array arrangement information of the plurality of piezoelectric elements in the element group;

calculating a propagation path of an ultrasonic beam from the element group based on the reference position and a predetermined refraction angle;

calculating a delay time of each of the plurality of piezoelectric elements in the element group in such a manner that the ultrasonic beam is configured to propagate along the propagation path;

receiving respective ultrasonic waves transmitted from an inspection object and received with the plurality of piezoelectric elements as detection signals; and generating at least one composite signal for the ultrasonic beam having the propagation path based on the detected signals and the delay time.

Further, embodiments described hereinafter provide a manufacturing method of a product comprising:

preparing a structure;

performing the above ultrasonic flaw detection method on the structure as the inspection object;

completing the structure, on which the ultrasonic flaw detecting method is performed, as the product.

According to embodiments, an ultrasonic flaw detection technique with improved spatial resolution of flaw detection and a manufacturing method of a product based on this ultrasonic flaw detection technique are provided.

First Embodiment

As shown in FIG. 1, the ultrasonic flaw detecting apparatus 10 according to the first embodiment includes an array probe 34 equipped with plural piezoelectric elements 33, an element-group defining circuit 16, a delay-time calculator 11, a composite-signal generator 31. Each of the piezoelectric elements 33 can transmit and receive ultrasonic waves to/from an inspection object 35.

As shown in the bottom of FIG. 1, the element-group defining circuit 16 selects and defines plural element groups $13_1, 13_2, \ldots, 13_M$ from all the piezoelectric elements 33 constituting the array probe 34 in such a manner that each of the element groups $13_1, 13_2, \ldots, 13_M$ is composed of plural consecutive piezoelectric elements 33. Hereinafter, all the element groups $13_1, 13_2, \ldots, 13_M$ are sometimes shortly referred to as the element groups 13, and one of the element groups $13_1, 13_2, \ldots, 13_M$ is sometimes shortly referred to as each element group 13. Additionally, the element-group defining circuit 16 sets reference positions C ($C_1, C_2, \ldots, C_M$) of the respective element groups 13 (FIG. 3B) on the basis of the array arrangement information of the piezoelectric elements 33 constituting each element group 13 and also on the basis of weighting of each of the piezoelectric elements 33. Further, the element-group defining circuit 16 calculates a propagation path of an ultrasonic beam from each element group 13 based on its reference position C and a predetermined refraction angle.

The delay-time calculator 11 calculates a delay time 21 of each of the piezoelectric elements 33 constituting each element group 13 in such a manner that the ultrasonic beam from each element group 13 is configured to propagate along a predetermined propagation path.

A signal receiver 23 receives ultrasonic waves received with the respective piezoelectric elements 33 as detection signals 25. Such ultrasonic waves received with the respective piezoelectric elements 33 is transmitted from the inspection object 35, such as a flaw or a crack inside the inspection object 35, or a boundary of the inspection object 35.

The composite-signal generator 31 composes the detection signals 25 according to the delay time 21 so as to generate a composite signal for the ultrasonic beam having the propagation path. In other words, the composite-signal generator 31 generates a composite signal for the ultrasonic beam having the predetermined propagation path based on the detection signals 25 and the delay time 21.

Each of the piezoelectric elements 33 is configured of, e.g., a ceramic, a polymer film, and a composite material, inputs a voltage signal so as to output an ultrasonic wave by a piezoelectric effect, and inputs an ultrasonic wave so as to output a detection signal 25 by a piezoelectric effect. In addition to the piezoelectric elements 33, the array probe 34 is equipped with other non-illustrated components such as a damping material for damping an ultrasonic wave and a front plate attached to its ultrasonic oscillation surface.

Although the linear array probe 34 in which the piezoelectric elements 33 are one-dimensionally arrayed is used in the present embodiment, embodiments of the present invention are not limited to such an array probe. Any array probe can be applied to embodiments of the present invention as long as plural piezoelectric elements are arrayed at a predetermined pitch.

Specifically, the following array probes are exemplified as array probes that can be used in embodiments of the present invention. It is possible to use a 1.5-dimensional array probe obtained by dividing the piezoelectric elements 33 in a non-uniform size in the depth direction of the linear array probe, a matrix array probe in which the piezoelectric elements 33 are two-dimensionally arrayed, a ring array probe in which ring-shaped piezoelectric elements 33 are concentrically arrayed, a split ring array probe obtained by dividing the piezoelectric elements 33 of the ring array probe in the circumferential direction, an irregular-arrangement probe in which the piezoelectric elements 33 are irregularly disposed, an arcuate array probe in which piezoelectric elements are arrayed in the circumferential directional position of an arc, and a spherical array probe in which piezoelectric elements are arrayed on a spherical surface.

Further, the present embodiment can be applied to a tandem flaw detection using any combination of these array probes regardless of the types of these array probes. Additionally, the above-described array probes include those which can be used by coking or packing regardless of whether it is underwater or in air.

Although description of the arrangement of the array probe 34 is omitted in the present embodiment, as to installation of the array probe 34 on the inspection object 35, ultrasonic waves can be made incident at a high-directivity angle by interposing a wedge. For this wedge, an isotropic material that can transmit ultrasonic waves and has a known acoustic impedance is used. Specifically, for this wedge, it is possible to use acrylic, polyimide, gel, other polymers, a material having acoustic impedance close to or equal to that of the front plate, and a material having acoustic impedance close or equal to that of the inspection object 35. Further, for this wedge, it is possible to use a composite material that changes the acoustic impedance stepwise or gradually and it is also possible to use other appropriate materials.

In order to prevent multiple reflection waves inside the wedge from affecting the flaw detection result, in some cases, a damping material is disposed inside and outside the wedge, a mountain-type wave erasing shape is provided, and/or a multiple-reflection reduction mechanism is provided.

Figure 3A:
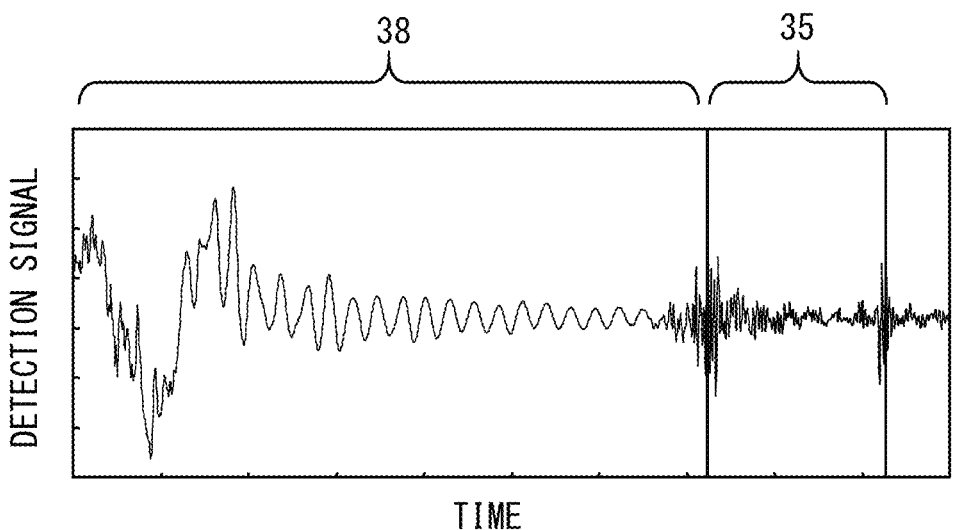
FIG. 3A is a waveform graph of a detection signal.

At the time of installing the array probe 34 on the inspection object 35, an acoustic coupling medium 38 (FIG. 3A to FIG. 3C) is sometimes interposed for the purpose of reducing the contact impedance.

Although the acoustic coupling medium 38 is exemplified by, e.g., water, glycerin, machine oil, castor oil, acrylic, polystyrene, and gel, the acoustic coupling medium 38 is not limited to those. For the acoustic coupling medium 38, it is possible to use any appropriate material that can transmit ultrasonic waves while suppressing attenuation.

An element driver 18 applies a voltage signal of an arbitrary waveform to each of the piezoelectric elements 33 constituting the array probe 34, and causes the piezoelectric elements 33 to operate and output ultrasonic waves. A waveform of this voltage signal may be, e.g., a sinusoidal wave, a sawtooth wave, a rectangular wave, a spike pulse, a bipolar wave having both values of the positive pole and the negative poles, or a unipolar wave having either positive or negative swing. In addition, an offset may be added to either positive or negative. Further, the waveform can be increased or decreased in the application time or repetition wave number, like a single pulse, burst waves, or a continuous wave.

In the first embodiment, the order in which the element driver 18 drives each of the plural piezoelectric elements 33 is random regardless of its array and is not limited to a specific order. As long as each detection signal 25 does not cause such an interference that an influence affecting the flaw detection determination appears in the image, the drive delay time for driving the piezoelectric elements 33 is also arbitrary.

The element-group defining circuit 16 stores information in which a predetermined number N of plural consecutive piezoelectric elements to be selected from all the plural piezoelectric elements 33 constituting the array probe 34 are defined as each of the element groups 13 ($13_1$, $13_2$, ..., $13_M$). Further, the element-group defining circuit 16 holds information on the refraction angle and the focal depth. Instead of the information on the refraction angle and the focal depth, the element-group defining circuit 16 may store information that defines focal positions F ($F_1$, $F_2$, ..., $F_M$) corresponding to the respective element groups 13 ($13_1$, $13_2$, ..., $13_M$).

Figure 3B:
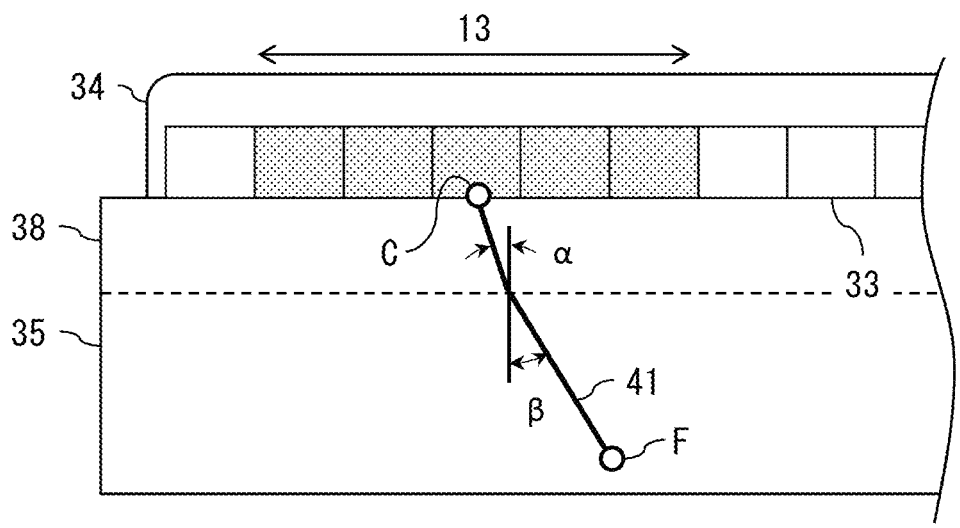
FIG. 3B and FIG. 3C are schematic diagrams illustrating a beam line of the first composite signal.

Moreover, the element-group defining circuit 16 stores information that defines the reference positions C ($C_1$, $C_2$, ..., $C_M$) corresponding to the respective element groups 13 ($13_1$, $13_2$, ..., $13_M$) as shown in FIG. 3B. Each reference position C is also generally called the element group center. Although each reference position C is set at the coordinate centroid position of each element group 13 in the description of each embodiment, each reference positions C is not limited to the coordinate centroid. In particular, in the present embodiment, each reference position C is determined on the basis of the opening width (weighting) of each of the piezoelectric elements 33 in addition to being based on the position of each element group 13 and the arrangement information (array arrangement information) of the piezoelectric elements 33 constituting the element groups 13 ($13_1$, $13_2$, ..., $13_M$). The array arrangement information is information defining an arrangement of the piezoelectric elements 33 in the element groups 13 ($13_1$, $13_2$, ..., $13_M$) and/or a positional relationship between such piezoelectric elements 33. An example of the array arrangement information includes, but not limited to, array pitch P of the piezoelectric elements 33 and/or order of such piezoelectric elements 33. In other words, the element-group defining circuit 16 is configured such that the arrangement information (array arrangement information) of each of the piezoelectric elements 33 constituting the element groups 13 ($13_1$, $13_2$, ..., $13_M$) and coefficients related to the opening width (i.e., the coefficients correspond to a weighting values) of each of the piezoelectric elements 33 can be inputted to the element-group defining circuit 16. The above-described opening width of each of the piezoelectric elements 33 indicates the proportion (i.e., weighting) of ultrasonic signals transmitted or received by each of the piezoelectric elements 33, and can be appropriately set by adjusting the transmission output of each piezoelectric element 33 or by adjusting the gain of the signal received by each piezoelectric element 33.

When the reference positions C ($C_1$, $C_2$, ..., $C_M$) corresponding to the respective element groups 13 ($13_1$, $13_2$, ..., $13_M$) are determined on the basis of the arrangement information (array arrangement information) of the piezoelectric elements 33 and the weighting of each of the piezoelectric elements 33, the focal positions F ($F_1$, $F_2$, ..., $F_M$) corresponding to the respective element groups 13 ($13_1$, $13_2$, ..., $13_M$) are determined on the basis of the respective reference positions C ($C_1$, $C_2$, ..., $C_M$), the predetermined refraction angles (e.g., an incident angle and a refraction angle), and the predetermined focal depth.

The element-group defining circuit 16 calculates the propagation path 14 of the ultrasonic wave passing through each focal position F inside the inspection object 35 on the basis of a combination of one or two piezoelectric elements that are selected from the piezoelectric elements 33 arrayed in each element group 13 so as to transmit/receive an ultrasonic wave. The calculation of the propagation path 14 is executed on the basis of conditions such as a surface shape and density of both of the inspection object 35 and the acoustic coupling medium 38.

Figure 2A:
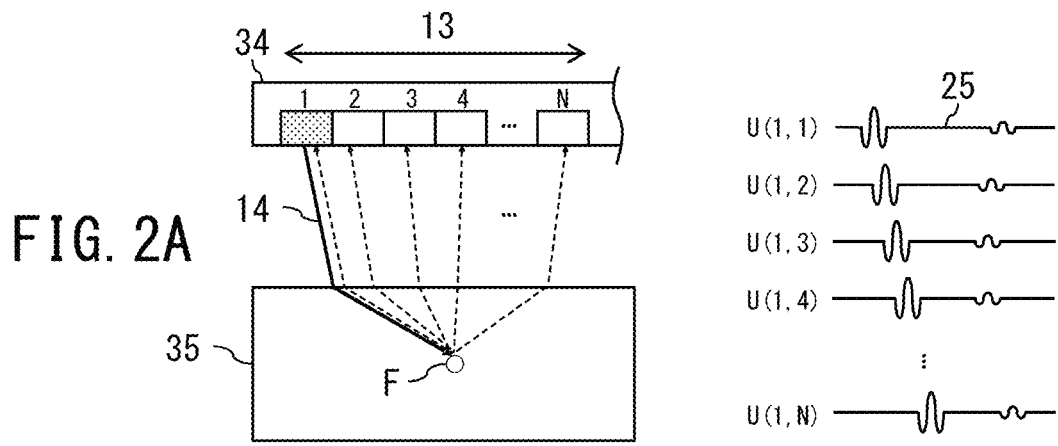
FIG. 2A to FIG. 2D are schematic diagrams illustrating a propagation path of an ultrasonic wave, a detection signal, and a first composite signal.

As shown in FIG. 2A, when one of N piezoelectric elements 33 constituting one element group 13 (e.g., the element with the sign 1 in the case of FIG. 2A) is set as a transmission element and all the piezoelectric elements including this transmission element are set as reception elements, N different propagation paths 14 can be set. In this case, when all the piezoelectric elements are set as the transmission elements in sequence, N×N propagation paths 14 are set for this element group 13.

The delay-time calculator 11 calculates the ultrasonic delay times 21 in the respective combinations of the piezoelectric elements 33 on the basis of the respective propagation paths 14. The range of each propagation path 14 corresponds to the arrival time of each ultrasonic wave. When the reference propagation path is set to the propagation path in which the piezoelectric element 33 set as the reference position C is combined as the transmission element and the reception element, the difference between this reference propagation path and each of the other propagation paths 14 becomes equivalent to each delay time 21. This reference propagation path is not limited to combining the same piezoelectric element 33 with transmission and reception elements. The reference propagation path can be adopted on the basis of a propagation path that is a combination of one or two piezoelectric elements 33 at arbitrary positions.

Each delay time 21 of the ultrasonic wave calculated by the delay-time calculator 11 is stored in a storage unit in association with the corresponding combination of the piezoelectric elements 33.

The composite wave is composed according to the delay time 21 calculated by the delay-time calculator 11 on the basis of the ultrasonic waves that are transmitted and received from/by the respective piezoelectric elements 33 constituting the element groups 13 ($13_1, 13_2, \ldots, 13_M$). This composite wave is referred as an ultrasonic beam of a predetermined refraction angle from the element groups 13 ($13_1, 13_2, \ldots, 13_M$) of the respective reference positions C ($C_1, C_2, \ldots, C_M$). The ultrasonic beam from the element groups 13 ($13_1, 13_2, \ldots, 13_M$) is a composite wave having directivity that is obtained by composing ultrasonic waves propagating to spread from each of the piezoelectric elements 33. In the present embodiment, the propagation path of the ultrasonic beam is defined as a path from each reference position C ($C_1, C_2, \ldots, C_M$) having predetermined refraction angles (such as the incident angle and the refraction angle), and this propagation path reaches the focal point F. The propagation path of the ultrasonic beam may be defined on the basis of the reference positions C ($C_1, C_2, \ldots, C_M$) and the focal points F ($F_1, F_2, \ldots, F_M$), both of which correspond to the respective element groups 13 ($13_1, 13_2, \ldots, 13_M$).

As described above, the ultrasonic flaw detecting apparatus 10 previously defines the reference-position setting rule for defining the reference positions C related to the element groups 13 ($13_1, 13_2, \ldots, 13_M$) and the propagation-ultrasonic-beam setting rule related to defining the propagation path of the ultrasonic beam as the composite wave. Further, the reference positions C of the respective element groups 13 ($13_1, 13_2, \ldots, 13_M$) and the propagation path of the ultrasonic beam from the element groups 13 ($13_1, 13_2, \ldots, 13_M$) are determined on the basis of the reference-position setting rule and the propagation-ultrasonic-beam setting rule. In this manner, it is possible to treat the ultrasonic beam, which is a composite wave of ultrasonic waves from the plural piezoelectric elements 33 constituting the respective element groups 13 ($13_1, 13_2, \ldots, 13_M$), like a wave of one propagation path having respective directivities of the ultrasonic waves.

The signal receiver 23 receives detection signals 25 (FIG. 3A) obtained by converting the ultrasonic waves, which are made incident on the respective piezoelectric elements 33, into voltage signals under the piezoelectric effect. Ultrasonic waves made incident on the acoustic coupling medium 38 and the inspection object 35 from the piezoelectric elements 33 are first largely reflected and scattered on the surface of the inspection object 35, and then reflected and scattered by flaws (i.e., defects) such as a crack opened on the surface of the inspection object 35 and an inclusion inside the inspection object 35. The ultrasonic waves reflected and scattered in this manner are made incident on each of the piezoelectric elements 33 arrayed in the array probe 34, and each of the detection signals 25 outputted from the respective piezoelectric elements 33 is individually received in the corresponding channel of the signal receiver 23.

An intensity detector 26 converts the voltage waveforms of the received detection signals 25 into digital data by A/D (analogue to digital) conversion. The intensity detector 26 may have a function of amplifying the detection signals 25 and a filter function of extracting only the component of a predetermined frequency. The detection signals 25 converted into digital data are stored in a non-illustrated data storage unit (i.e., memory) by associating the received channel information of the piezoelectric elements 33 with each reception time.

Figure 2B:
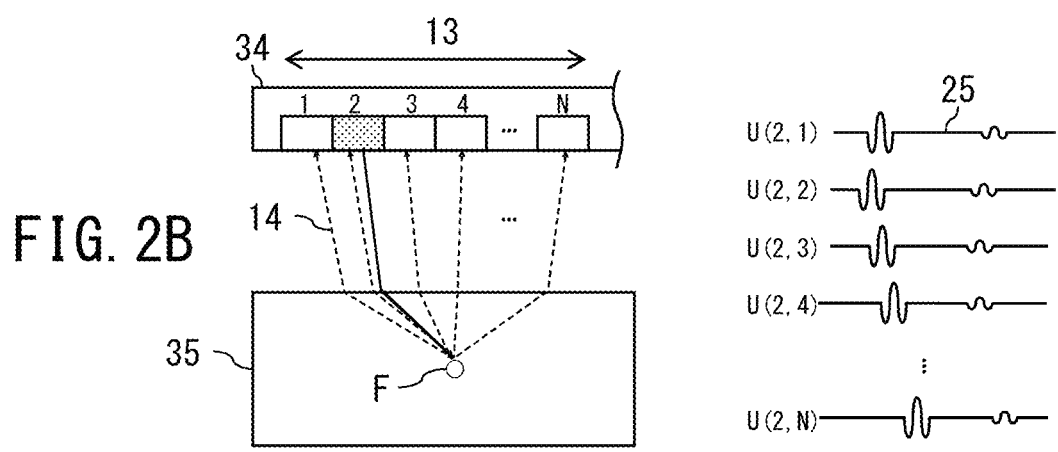
Figure 2C:
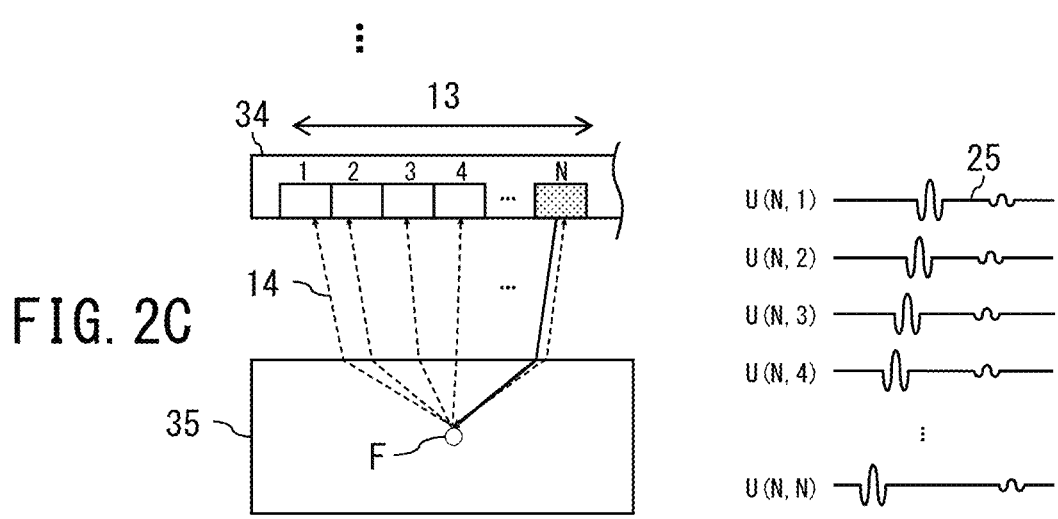

The right side of each of FIG. 2A, FIG. 2B, and FIG. 2C indicates a timing chart U (a, b) of the detection signals 25 outputted when specified one or two of the piezoelectric elements 33 are used as a transmission element and a reception element. As to the timing chart U (a, b), "a" indicates the identification number of the transmission element and "b" indicates the identification number of the reception element.

Figure 2D:
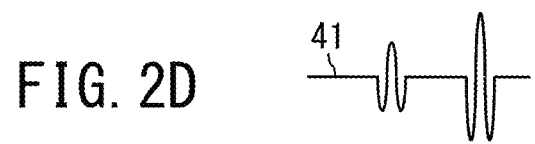

The composite-signal generator 31 composes the ultrasonic waves received by the respective piezoelectric elements 33 constituting the element groups 13 ($13_1, 13_2, \ldots, 13_M$) according to the delay times 21 calculated by the delay-time calculator 11. In other words, the composite-signal generator 31 shifts each of the detection signals 25 related to the ultrasonic waves outputted from the respective piezoelectric elements 33 in the time-axis direction by the delay time 21 stored in association with the corresponding combination of the piezoelectric elements 33. Further, the composite-signal generator 31 composes the group of the detection signals 25 subjected to the above-described delay processing by treating each element group 13 as a unit so as to generate the first composite signal 41 (FIG. 2D). In other words, the first composite signal 41 is a composite wave related to the ultrasonic beam having the propagation path, which is determined on the basis of the predetermined refraction angle, from the element groups 13 ($13_1, 13_2, \ldots, 13_M$) of the respective reference positions C ($C_1, C_2, \ldots, C_M$), and the first composite signal 41 is also a composite wave obtained based on the detection signals 25 and the respective delay times 21, i.e., by composing the detection signals 25 according to the respective delay times 21. In addition to the case where the above-described averaging method is applied, other known methods can also be applied to the composition of the detection signals 25 in units of the element groups 13 ($13_1, 13_2, \ldots, 13_M$).

In the present embodiment, weighting (i.e. opening width) is set for each of the piezoelectric elements 33 constituting each element group 13. As described above, this weighting (opening width) can be reflected by adjusting the output of the ultrasonic wave transmitted from each of the piezoelectric elements 33. Besides this, the weighting (opening width) can be reflected by adjusting the gain of the signal received by each of the piezoelectric elements 33, without changing the outputs of the respective transmitted ultrasonic waves from the piezoelectric elements 33 for each piezoelectric element 33.

When adjusting the weighting value (opening width) of each piezoelectric element 33 by adjusting the gain of the signal received by each piezoelectric element 33, the composite-signal generator 31 performs gain adjustment, which is equivalent to weighting value or opening width, on the detection signals 25 of the ultrasonic waves received by the respective piezoelectric elements 33 and then generates the first composite signal 41 by composing the detection signals 25, gains of which have been adjusted according to the respective delay times 21.

When weighting (opening width) to each of the piezoelectric elements 33 is performed by adjusting the outputs of ultrasonic waves transmitted from the respective piezoelectric elements 33, the composite-signal generator 31 may compose the detection signals 25 related to the ultrasonic waves received by the respective piezoelectric elements 33 according to the delay times 21 without adjusting the gains.

The line connecting the reference position C and the focal position F shown in FIG. 3B indicates a beam line (i.e., propagation path) of an ultrasonic beam corresponding to the first composite signal 41 that is made incident on the inspection object 35 from the element group 13 and is reflected on the same trajectory. Both of FIG. 3B and FIG. 3C illustrate the case where the number (i.e., predetermined number N) of the piezoelectric elements 33 constituting each element group 13 is 5 and the weighting (opening width) of each of the piezoelectric elements 33 is 100%.

Each reference position C determined on the basis of the arrangement information (array arrangement information) of the piezoelectric elements 33 and the weighting of each of the piezoelectric elements 33 corresponds to the incident position of the ultrasonic beam on the acoustic coupling medium 38. In the case of FIG. 3B, the coordinates of the reference position C are determined by the reference-position setting rule in which weighted average is performed on the center position coordinates of the respective piezoelectric elements 33 by multiplying respective weighting values (in this case, all the weighting values are 100%).

The ultrasonic beam made incident on the acoustic coupling medium 38 at the reference position C at an incident angle $\alpha$ is refracted at the interface with the inspection object 35, and is made incident on the inspection object 35 at a refraction angle $\beta$. Each of the incident angle $\alpha$ and the refraction angle $\beta$ is defined by the angle of the beam line of the ultrasonic beam corresponding to the first composite signal 41 with respect to the normal direction of the surface of the acoustic coupling medium 38 and the inspection object 35. Hereinafter, the direction of the beam line of the ultrasonic beam, which is determined on the basis of the incident angle $\alpha$ at the reference position C and the refraction angle $\beta$ inside the inspection object 35, is collectively referred to as a refraction angle.

Figure 3C:
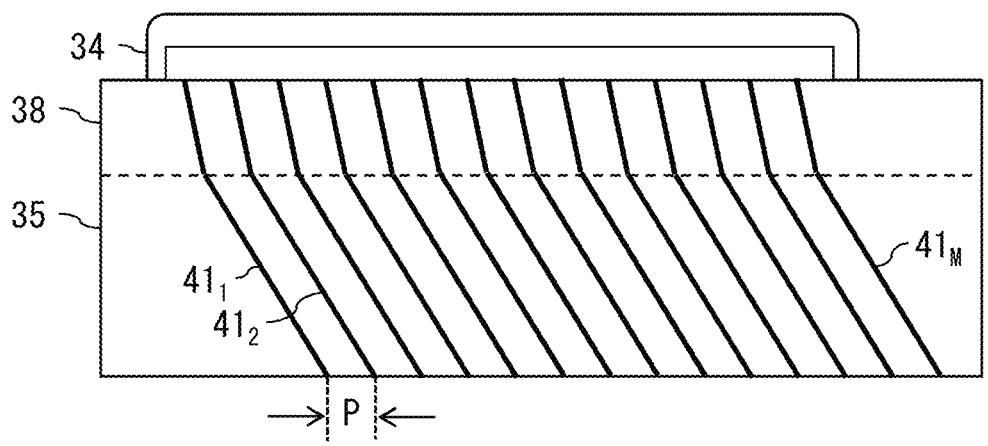

FIG. 3C illustrates a beam line (i.e., propagation path) of the ultrasonic beam corresponding to the first composite signals 41 ($41_1$, $41_2$, . . . , $41_M$), which are generated in the respective element groups 13 ($13_1$, $13_2$, . . . , $13_M$) defined by shifting the piezoelectric elements 33 constituting the element group 13 ($13_1$, $13_2$, . . . , $13_M$) by one pitch and keeping the weighting unchanged at, e.g., 100%.

In other words, every first composite signal 41 ($41_1$, $41_2$, . . . , $41_M$) has the same incident angle $\alpha$ and the same refraction angle $\beta$. Thus, the beam lines of the ultrasonic beams corresponding to these first composite signals 41 ($41_1$, $41_2$, . . . , $41_M$) are parallel to each other, have the same refraction angle, and are discretely arranged in such a manner that the reference position C as the center of the element group is shifted by one pitch (i.e., distance P) of the array of the piezoelectric elements 33 each time the piezoelectric elements 33 constituting the element groups 13 ($13_1$, $13_2$, . . . , $13_M$) are shifted by one pitch. The predetermined number N, which is the number of the piezoelectric elements 33 constituting each element group 13 ($13_1$, $13_2$, . . . , $13_M$), is 5 similarly to the case of FIG. 3B, and the piezoelectric elements 33 are equal to each other in weighting value as described above. Thus, the total value of the weighting values of the respective piezoelectric elements 33 constituting one element group (one of $13_1$, $13_2$, . . . , or $13_M$) is constant and common to all the element groups $13_1$, $13_2$, . . . , $13_M$.

Next, by referring to FIG. 4A to FIG. 4C, a description will be given of the second composite signal 42 obtained by setting a beam line (propagation path) of the ultrasonic beam between two first composite signals $41_n$ and $41_{n+1}$ that are shifted by one pitch (i.e., distance P) of the array of the piezoelectric elements 33.

Figure 4A:
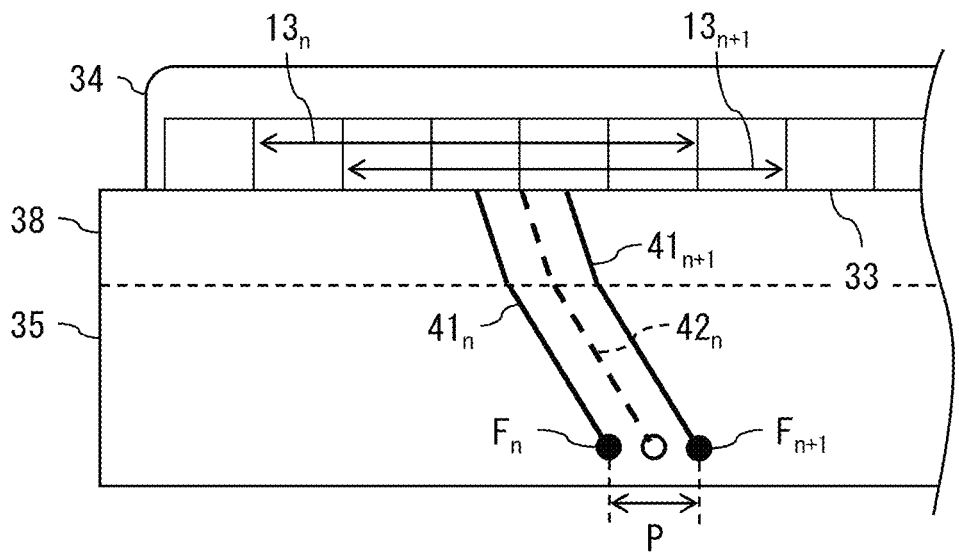
FIG. 4A and FIG. 4B are schematic diagrams illustrating a beam line of the second composite signal.

As shown in FIG. 4A, the two first composite signals $41_n$ and $41_{n+1}$ are composite signals for the ultrasonic beams from the element groups $13_n$ and $13_{n+1}$, respectively. Further, the reference positions $C_n$ and $C_{n+1}$ of the respective element groups $13_n$ and $13_{n+1}$ are set in such a manner that (a) the number (i.e., predetermined number N) of the piezoelectric elements 33 constituting each of the element groups $13_n$ and $13_{n+1}$ is set to the first predetermined number of 5 and (b) the weighting value (opening width) of every piezoelectric element 33 of the element groups $13_n$ and $13_{n+1}$ is set to 100%, similarly to FIG. 3B. The propagation paths of the first composite signals $41_n$ and $41_{n+1}$ are set on the basis of the reference positions $C_n$ and $C_{n+1}$ of the respective element groups $13_n$ and $13_{n+1}$ and the predetermined refraction angles such as the incident angle $\alpha$ and the refraction angle $\beta$.

In this case, the piezoelectric elements 33 constituting the element group $13_n$ or the element group $13_{n+1}$ are set as an element group $13_{n+0.5}$. The number (i.e., predetermined number N) of the piezoelectric elements 33 constituting the element group $13_{n+0.5}$ is 6 that is the second predetermined number being larger by 1 than the first predetermined number of 5. Further, for instance, the weighting values of the respective two piezoelectric elements 33 at the both ends of the six piezoelectric elements 33 constituting the element group $13_{n+0.5}$ are both set to 50%, and the weighting values of the other four piezoelectric elements of the element group $13_{n+0.5}$ are set to 100%. The reference position $C_{n+0.5}$ of the element group $13_{n+0.5}$ is set at an intermediate position between the reference positions $C_n$ and $C_{n+1}$ of the element groups $13_n$ and $13_{n+1}$ by setting the predetermined number N to the second predetermined number, which is larger than the first predetermined number, and changing the weighting value of each of the piezoelectric elements 33 constituting the element group $13_{n+0.5}$ from the same value, which predetermined number N is the number of the piezoelectric elements 33 constituting the element group $13_{n+0.5}$.

When the position of the reference position $C_{n+0.5}$ of the element group $13_{n+0.5}$ is determined, the focal position $F_{n+0.5}$ is determined on the basis of the predetermined focal depth and the predetermined refraction angles such as the incident angle $\alpha$ and the refraction angle $\beta$. Here, the refraction angle of the ultrasonic beam from each of the element groups $13_n$ and $13_{n+1}$ is equal to the refraction angle of the ultrasonic beam from the element group $13_{n+0.5}$. Thus, the focal position $F_{n+0.5}$ is set to a virtual position obtained by moving the focal position F in the array direction by a distance shorter than the distance P that corresponds to one pitch of the array of the piezoelectric elements 33.

In the present embodiment, the focal position $F_{n+0.5}$ is set at the center position separated by the distance P/2 from each of the focal positions $F_n$ and $F_{n+1}$ of the ultrasonic beams from the element groups $13_n$ and $13_{n+1}$. However, this is only one aspect, and it is also possible to set the distance P for one pitch to a further finely adjusted position by appropriately setting the predetermined number N of the element group $13_{n+0.5}$ and the weighting of each of the piezoelectric elements 33 constituting the element group $13_{n+0.5}$.

Incidentally, the reference position $C_{n+0.5}$ may be set to a position between the reference positions $C_n$ and $C_{n+1}$ of the respective element groups $13_n$ and $13_{n+1}$ by adjusting only the weighting value of each of the piezoelectric elements 33 without changing the predetermined number N of the element group $13_{n+0.5}$ from the first predetermined number. As to the total value of the weighting values of the respective piezoelectric elements 33 of the element group $13_n$ or $13_{n+1}$ and the total value (or average value) of the weighting values of the respective piezoelectric elements 33 constituting the element group $13_{n+0.5}$, both total values are preferably equal to each other regardless of the predetermined number N of each of the element groups $13_n$, $13_{n+0.5}$, and $13_{n+1}$.

However, it is not necessary to strictly equalize the total value or the average value of the weighting values of the respective piezoelectric elements 33 for each of the element groups $13_n$, $13_{n+0.5}$, and $13_{n+1}$, and it is sufficient to set the total value and/or the average value of the weighting values regarding the element groups $13_n$, $13_{n+0.5}$, and $13_{n+1}$ within a predetermined range that does not affect the flaw detection result. For instance, the weighting of the six piezoelectric elements 33 constituting the element group $13_{n+0.5}$ may be set such that the weighting value of the piezoelectric element 33 at one end is 40% or 60%, the weighting of the piezoelectric element 33 at the other end is 50%, and the weighting of the other four is 100%.

Although the tolerance of the deviation of the total or average of the weighting values of the piezoelectric elements 33 for each of the element groups $13_n$, $13_{n+0.5}$, and $13_{n+1}$ depends on factors such as material and structure of the inspection object 35 and/or the minimum size of the flaw to be detected, about ±50% of the average value is often allowed and it is generally considered to be sufficient if the average value falls within the range of ±50%.

When the focal position $F_{n+0.5}$ of the element group $13_{n+0.5}$ is determined on condition that the reference position is set at $C_{n+0.5}$, the ultrasonic propagation paths 14 from the respective piezoelectric elements 33 constituting the element group $13_{n+0.5}$ passing through the determined focal position F are calculated.

The calculation of the propagation paths 14 of the ultrasonic waves is performed for each of the piezoelectric elements 33 constituting the element group $13_{n+0.5}$ similarly to FIG. 2A to FIG. 2D, in such a manner that each propagation path 14 is calculated as the propagation path 14 of the ultrasonic wave passing through the focal position $F_{n+0.5}$ on the basis of a combination of one or two piezoelectric element(s) 33 inputting/outputting an ultrasonic wave to be selected from the piezoelectric elements 33 arrayed in the element group $13_{n+0.5}$. The calculation of each ultrasonic propagation path 14 is executed on the basis of conditions such as the surface shape and density of both of the inspection object 35 and the acoustic coupling medium 38.

The delay-time calculator 11 calculates the respective delay times 21 of the ultrasonic waves in the combinations of the piezoelectric elements 33, which similarly constitute the element group $13_{n+0.5}$, on the basis of the propagation path 14 of each ultrasonic wave. Each of the delay times 21 of the ultrasonic waves calculated by the delay-time calculator 11 is similarly stored in the storage unit in association with the corresponding combination of the piezoelectric elements 33 of the element group $13_{n+0.5}$.

The composite-signal generator 31 similarly composes ultrasonic waves received by the respective piezoelectric elements 33 constituting the element group $13_{n+0.5}$ in accordance with the delay times 21 calculated by the delay-time calculator 11. In other words, the composite-signal generator 31 shifts the detection signal 25 received at each of the channels of the signal receiver 23 in the time-axis direction by the delay time 21 stored in association with the corresponding combination of the piezoelectric elements 33. Further, the composite-signal generator 31 composes the group of the detection signals 25 subjected to the delay processing in units of the element group 13 so as to generate the second composite signal 42 (FIG. 4A). In other words, the second composite signal 42 is a composite wave related to the ultrasonic beam having a propagation path of the predetermined refraction angle from the element group $13_{n+0.5}$ at the reference position $C_{n+0.5}$ to be obtained based on the detection signals 25 and the respective delay times 21, i.e., by composing the detection signals 25 according to the respective delay times 21.

As explained, in the present embodiment, the composite-signal generator 31 generates the first composite signal 41 and the second composite signal 42. The first composite signal 41 is generated where the piezoelectric elements 33 in the element group $13_n$ is set to the first predetermined number, and the second composite signal 42 is generated where the piezoelectric elements 33 in the element group $13_{n+0.5}$ is set to a second predetermined number larger than the first predetermined number.

Figure 4B:
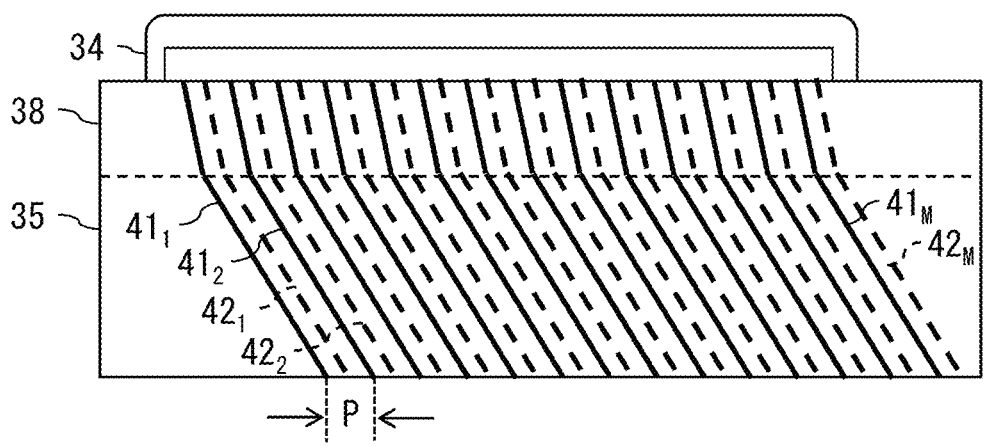

FIG. 4B illustrates beam lines corresponding to the first composite signals 41 ($41_1$, $41_2$, ..., $41_M$ indicated by solid lines) generated for the respective ultrasonic beams from the plural element groups $13_n$, $13_{n+1}$, ... obtained by shifting the piezoelectric elements 33 constituting the element groups $13_n$, $13_{n+1}$, ... by one pitch. FIG. 4B also illustrates beam lines corresponding to the second composite signals 42 ($42_1$, $42_2$, ..., $42_M$ indicated by broken lines) generated for the respective ultrasonic beams from the element group $13_{n+0.5}$ obtained by shifting the piezoelectric elements 33 constituting the element group $13_{n+0.5}$ by one pitch.

Figure 5A:
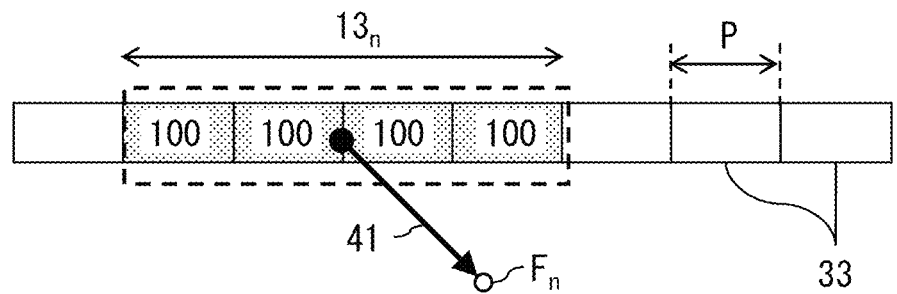
FIG. 5A to FIG. 5F are schematic diagrams illustrating an operation of the ultrasonic flaw detecting apparatus according to the first embodiment.
Figure 5B:
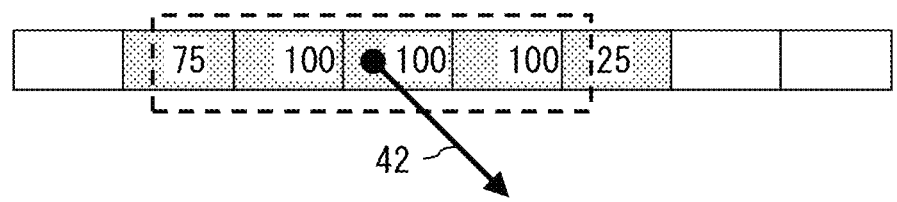
Figure 5C:
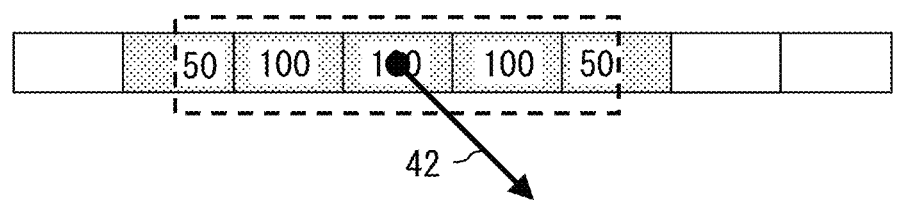
Figure 5D:
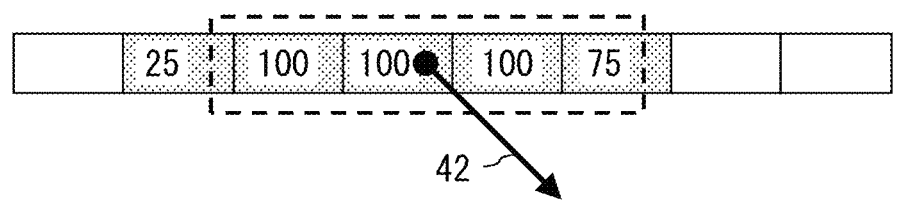
Figure 5E:
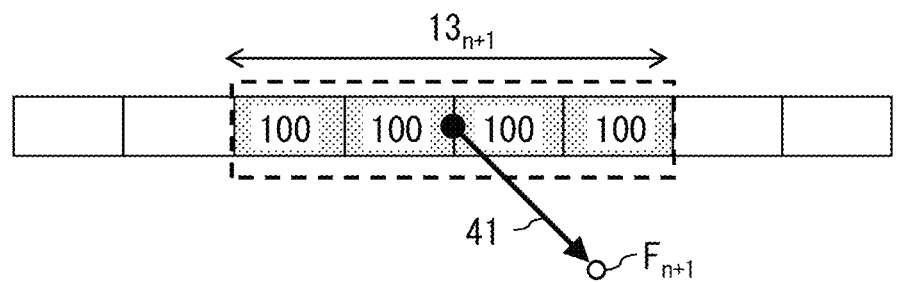

FIG. 5A and FIG. 5E illustrate the element groups $13_n$ and $13_{n+1}$ that are constituted by the predetermined number N=4 and are shifted from each other by one pitch. In this case, the opening width (weighting value) of every piezoelectric element 33 to be driven is set to 100%. Since the contribution rate is 100% in this case, from the respective detection signals 25, the first composite signal 41 processed by the composite-signal generator 31 is generated. At this time, the beam line of the first composite signal 41 is set so as to penetrate each of the defined focal positions $F_n$ and $F_{n+1}$ as described above.

Figure 5F:
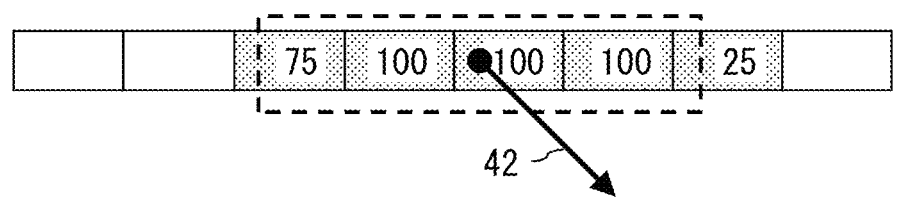

In FIG. 5B and FIG. 5F, the opening width (weighting value) of the piezoelectric element 33 positioned at one end of the element group 13 is set to 75% and the opening width (weighting value) of the piezoelectric element positioned at the other end is set to 25%. It is preferable to set the opening width values (weighting values) of the piezoelectric elements 33 positioned at both ends (of the respective elements group 13) in such a manner that the total value of the opening width values (weighting values) of all the piezoelectric elements 33 in each of elements group 13 to be driven substantially becomes a constant value. This is for leveling the detection sensitivity of flaws by all the beam lines of the first composite signals 41 and the second composite signals 42 defined for the inspection object.

In this case, the composite-signal generator 31 processes each detection signal 25 corresponding to the combination of the piezoelectric elements 33 having the opening width (weighting value) of 100% by using the contribution ratio of 100%, and gives such a weighting coefficient (a weighting value) to each detection signal 25 corresponding to the combination of the other piezoelectric elements that the contribution ratio becomes a value obtained by integrating the two opening-width values (weighting values). In this manner, the composite-signal generator 31 generates the second composite signal 42.

In this case, the beam line of the second composite signal 42 is set so as to penetrate a position shifted by P/4 from the defined focal position $F_n$ or $F_{n+1}$ in the array direction.

FIG. 5C and FIG. 5D illustrates the case where the opening width values (weighting values) of the piezoelectric elements 33 positioned at both ends are further increased or decreased by P/4 while the total value of the opening width values (weighting values) of all the piezoelectric elements to be driven is kept at a constant value. In each case, the detection signals 25 are processed on the basis of the opening width (weighting) of each piezoelectric element 33, the corresponding weighting coefficient (weighting value) of which is stored in the storage unit, and thereby the second composite signal 42 is generated. The beam line of the second composite signal 42 is set so as to penetrate a position shifted by P/2 or 3P/4 in the array direction from the defined focal position $F_n$.

Although a description has been given of cases where the opening width values (weighting values) of the piezoelectric elements 33 positioned at both ends are shifted by P/4, the shift amount is not limited to a specific value. Accordingly, the internal image of the inspection object 35 is generated on the basis of on the first composite signals 41 and the second composite signals 42 virtually derived from the first composite signals 41, and thus the internal image has high pixel density and excellent spatial resolution.

Figure 4C:
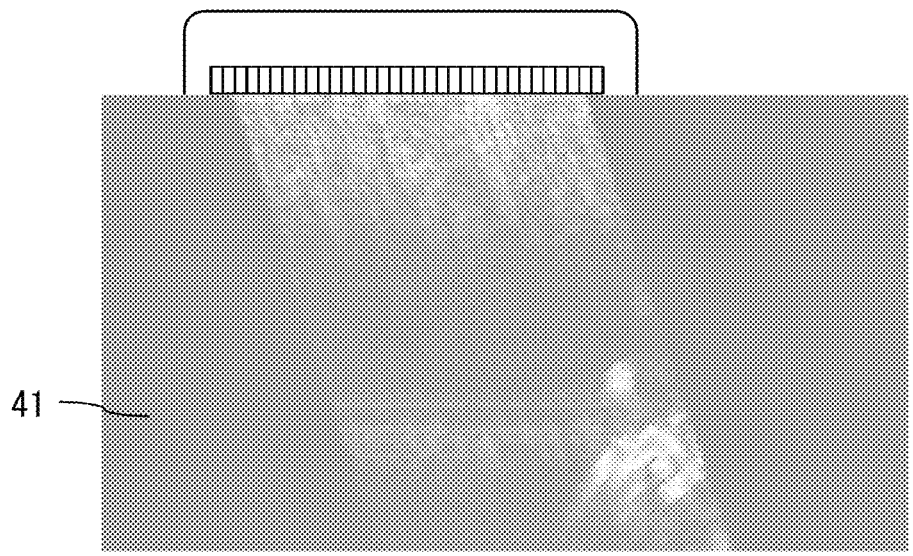
FIG. 4C is a schematic diagram illustrating an internal image of an inspection object.

An image generator 36 images the inside of the inspection object 35 on the basis of the first composite signals 41 and the second composite signal 42s that are generated by the composite-signal generator 31 in units of the plural element groups 13 ($13_1$, $13_2$, . . . , $13_M$) as shown in FIG. 4C.

The respective time axes of the first composite signals 41 and the second composite signals 42 correspond to the range of the beam line defined in the coordinate space of the inspection object 35. An image is generated by setting the luminance of the pixels on the beam line according to the intensity of the waveforms of the first composite signals 41 and the second composite signals 42.

In each embodiment, the beam line is finely set on the basis of the first composite signals 41 and the second composite signals 42 virtually derived from the first composite signals 41, and thus the internal image of the inspection object 35 has high pixel density and excellent spatial resolution.

The image generator 36 can display various information items such as the waveform of each detection signal 25 (FIG. 3A), the beam lines of the first composite signals 41 and the second composite signals 42 (FIG. 4B), the propagation path 14 of each ultrasonic wave (FIG. 2A to FIG. 2C), the virtual propagation path, the reference position C of each element group, and the focal position F in addition to the internal image of the inspection object 35 as described above.

Such an image generator 36 is sufficient as long as it can display digital data, and may be, e.g., a so-called PC monitor, a television, or a projector. The image generator 36 may be configured to display the above-described information after converting it into an analog signal once like a cathode ray tube. Additionally, the image generator 36 may have a so-called user interface function of causing an alarm by sound and/or light emission according to the determined conditions and inputting operation as a touch panel.

Second Embodiment

Figure 6:
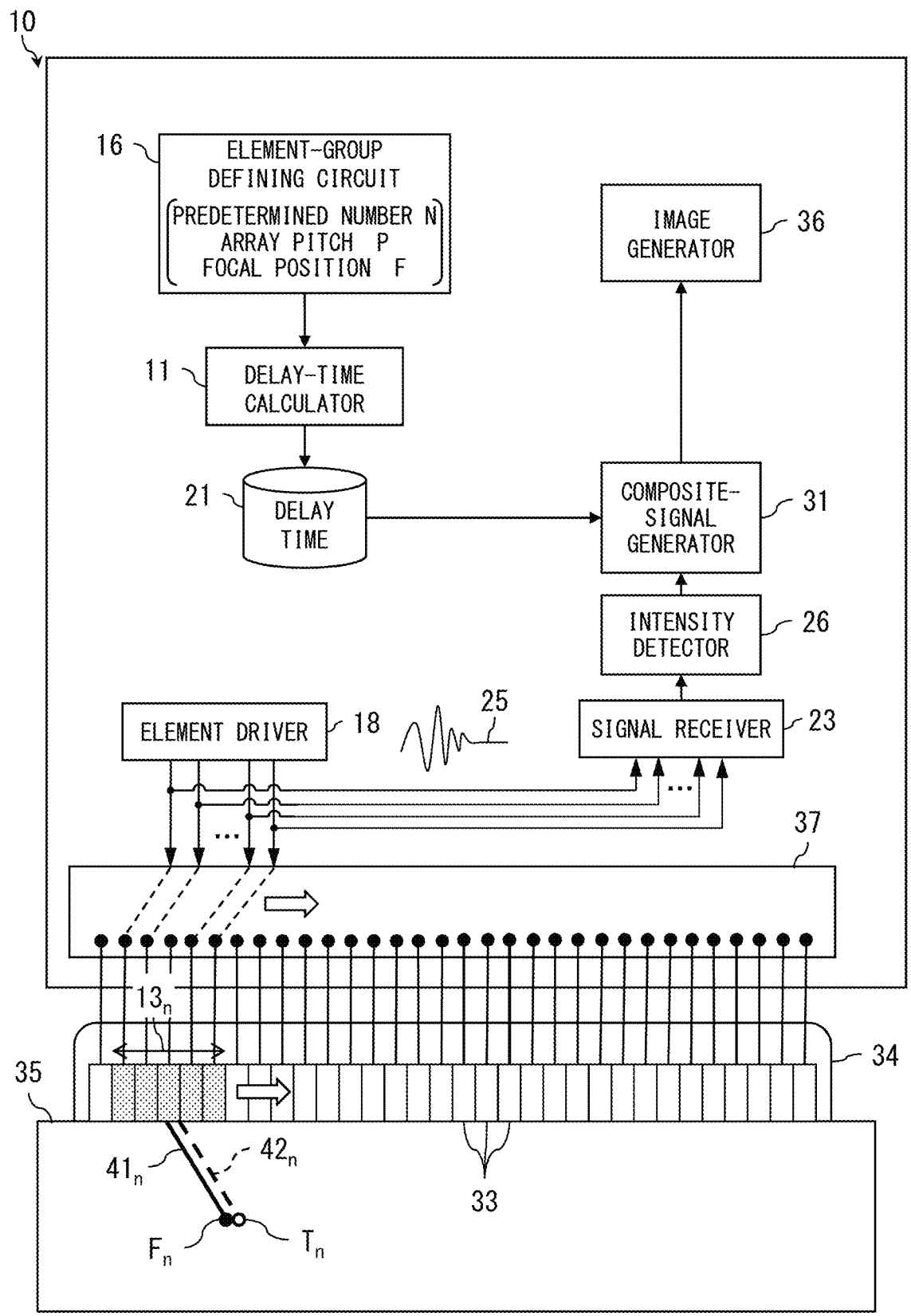
FIG. 6 is a block diagram illustrating an ultrasonic flaw detecting apparatus according to the second embodiment.

Next, the second embodiment of the present invention will be described with reference to FIG. 6. In FIG. 6, each component having the same configuration or function as that in FIG. 1 is denoted by the same reference sign in FIG. 1, and duplicate description is omitted.

The ultrasonic flaw detecting apparatus 10 according to the second embodiment further includes a switching unit (i.e., switcher) 37 that linearly scan the element groups 13 connected to the element driver 18 while shifting the array of the piezoelectric elements 33 by one pitch.

In the second embodiment, each time a set of the first composite signal 41 and the second composite signal 42 is obtained, the element groups 13 to be driven are consecutively swept by one pitch.

As a result, since the control channels in the element driver 18 and the signal receiver 23 need only be provided as many as the number of the piezoelectric elements 33 constituting the element groups 13, the circuit can be simplified.

Third Embodiment

Figure 7:
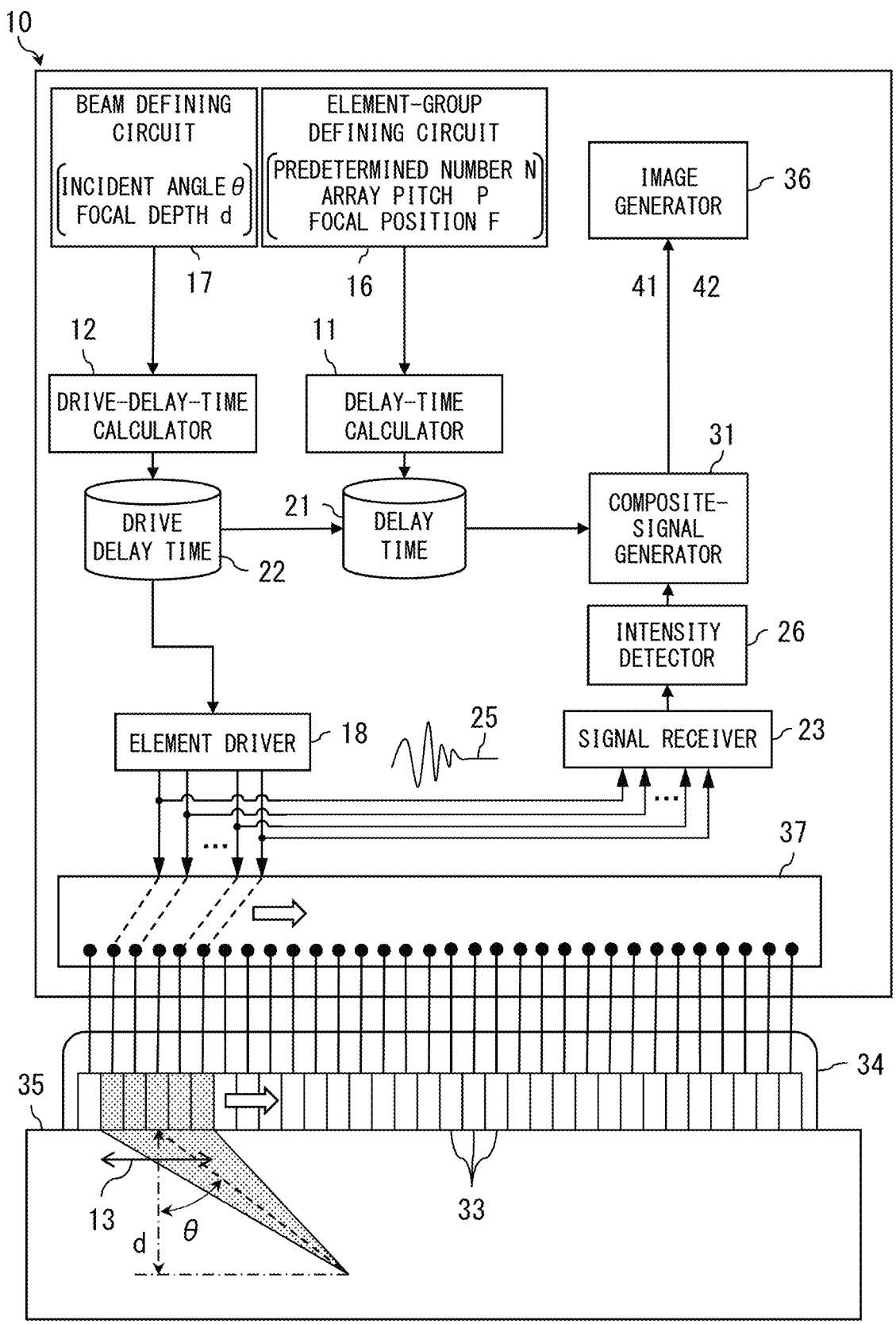
FIG. 7 is a block diagram illustrating an ultrasonic flaw detecting apparatus according to the third embodiment.

Next, the third embodiment of the present invention will be described with reference to FIG. 7. In FIG. 7, each component having the same configuration or function as that in FIG. 6 is denoted by the same reference sign in FIG. 6, and duplicate description is omitted.

The element driver 18 in the ultrasonic flaw detecting apparatus 10 according to the third embodiment drives the piezoelectric elements 33 on the basis of the drive delay time 22 that is calculated from the focal depth d and the incident angle θ of the ultrasonic beam outputted from the element groups 13, and thereby outputs ultrasonic waves.

A drive-delay-time calculator 12 calculates the drive delay time 22 according to conditions defined by a beam defining circuit 17. Since the drive delay time 22 is a value unique to the relative position in each element group 13 of the piezoelectric elements 33 to be driven, and the drive delay time 22 is stored in the storage unit in association with the control channel of the element driver 18.

Figure 8A:
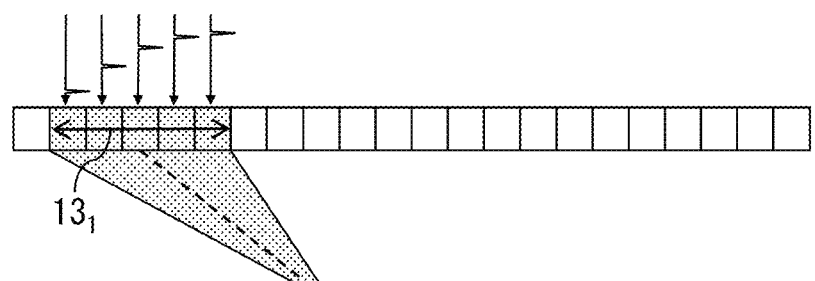
FIG. 8A to FIG. 8C are schematic diagrams illustrating a linear scan of ultrasonic waves in the third embodiment.

As shown in FIG. 8A, ultrasonic-beam irradiation is executed by driving the array of the piezoelectric elements 33 constituting the initial element group $13_1$ at the timing based on the drive delay time 22. As a result, the ultrasonic beam is radiated while converging toward the focal point.

Figure 8B:
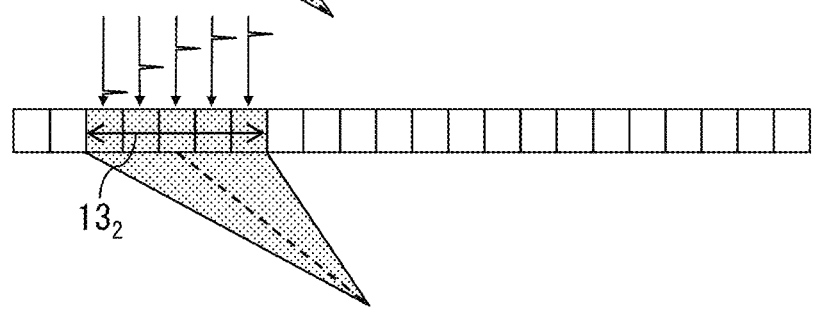
Figure 8C:
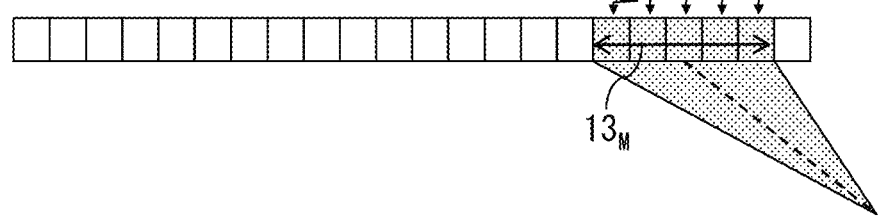

Further, as shown in FIG. 8B and FIG. 8C, the array of the piezoelectric elements 33 constituting each of the element groups $13_2$, . . . , $13_M$ shifted by one pitch is similarly driven by the timing based on the drive delay time 22. In this manner, the ultrasonic beam can be linearly moved together with the convergence point.

Figure 9:
FIG. 9 is a schematic diagram illustrating processing to be performed on a detection signal in the third embodiment.
Figure 9:

Further, as shown in FIG. 9, the composite-signal generator 31 generates each first composite signal 41 and each second composite signal 42 on the basis of the delay time 21 that is obtained by adding the drive delay time 22.

Figure 10:
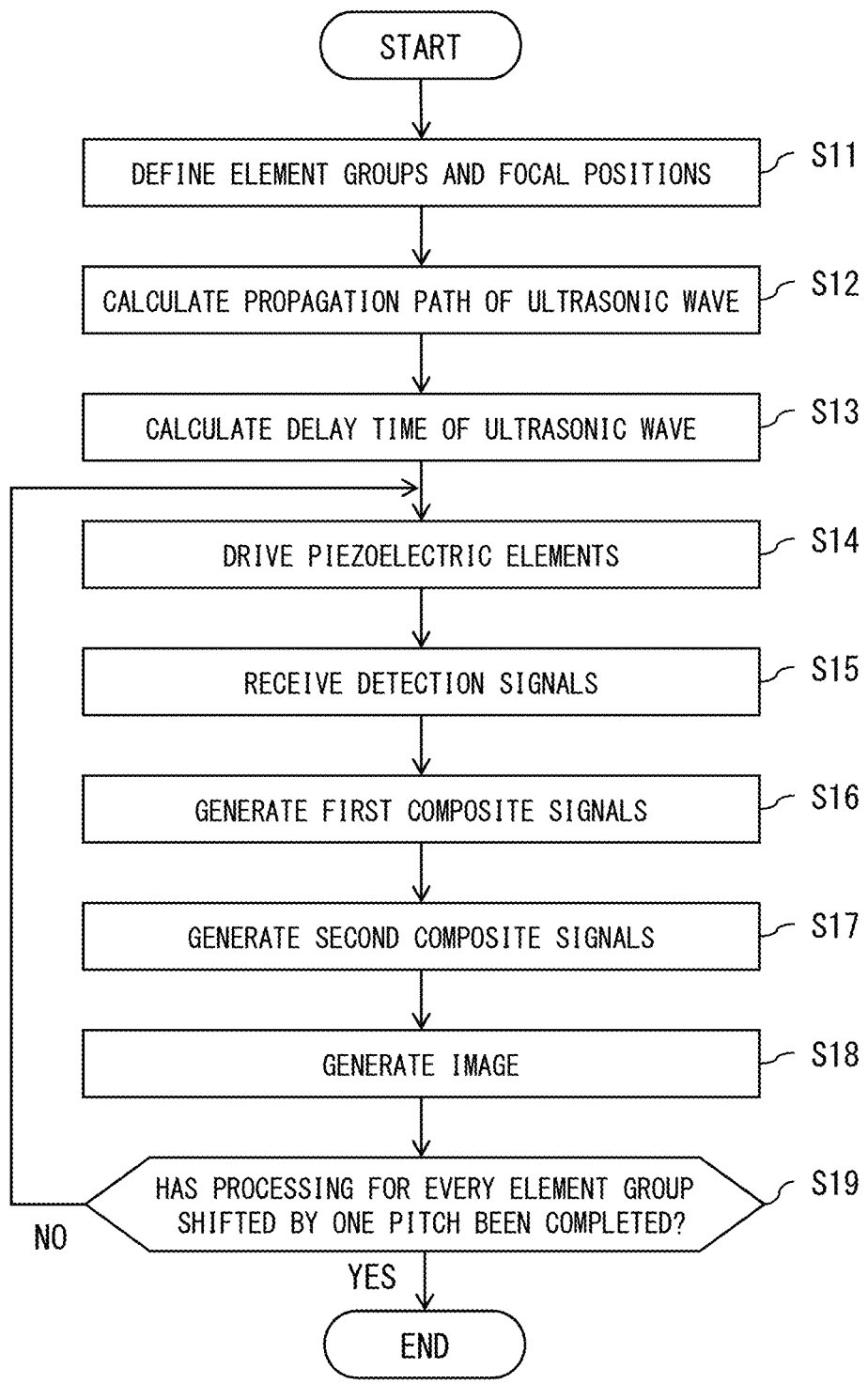
FIG. 10 is a flowchart illustrating an ultrasonic flaw detecting method according to each embodiment.

Next, an ultrasonic flaw detecting method according to one embodiment will be described on the basis of the step number shown in the flowchart of FIG. 10 by referring to FIG. 1, FIGS. 5A to 5F, FIG. 7, and FIGS. 8A to 8C as required.

In the first step S11, each element group 13 ($13_1$, $13_2$, . . . , $13_M$) is defined as a predetermined number N of consecutive piezoelectric elements 33 to be selected from all the piezoelectric elements 33 constituting the array probe 34. Further, the focal positions F corresponding to the respective element groups 13 are defined. Then, the information on each element group 13 and the focal positions F defined in this manner is stored.

In the next step S12, the propagation path 14 (FIG. 2A to FIG. 2D) of each ultrasonic wave passing through the focal position F in the inspection object 35 is calculated on the basis of the combination of the piezoelectric elements 33, which are selected for inputting and outputting ultrasonic waves from the piezoelectric elements 33 arrayed in the element group 13.

In the next step S13, the delay time 21 of each ultrasonic wave in the combination of the piezoelectric elements 33 is calculated on the basis of each propagation path 14.

In the next step S14, the piezoelectric elements 33 are driven so as to output the ultrasonic waves.

In the next step S15, the signal receiver 23 receives the detection signals (FIG. 2A to FIG. 2D) outputted from the respective piezoelectric elements 33 that have detected the ultrasonic waves reflected inside the inspection object 35.

In the next step S16, the first composite signals 41 ($41_1$, $41_2$, ..., $41_M$) are generated by composing the group of detection signals 25 on the basis of the delay times 21 (FIG. 2D and FIG. 3A to FIG. 3C)

In the next step S17, the second composite signals 42 ($42_1$, $42_2$, ..., $42_M$) are generated by the virtual processing (FIG. 4A and FIG. 4B).

In the next step S18, imaging of the inside of the inspection object 35 is performed on the basis of the first composite signals 41 and the second composite signals 42, both of which are generated in each of the plural element groups 13 ($13_1$, $13_2$, ..., $13_M$) defined by shifting the piezoelectric elements 33 by one pitch.

In the next step S19, it is determined as to whether the imaging processing of the step S18 is completed for all the element groups 13 or not, and the entire processing is completed when this determination result is affirmative.

According to the ultrasonic flaw referencing apparatus of at least one embodiment described above, it is possible to improve the spatial resolution of flaw detection by using the realistically generated first composite signals and the virtually generated second composite signals while size of each piezoelectric element constituting the array probe is kept unchanged.

Some embodiments of the present invention have been described above. These embodiments have been presented as examples. There is no intention to limit the scope of the invention. These embodiments can also be implemented in other various modes, and variously omitted, replaced, changed, and combined without departing from the gist of the invention. The embodiments and their variations are encompassed by the scope and gist of the invention. Likewise, these embodiments and variations are encompassed by the invention described in the claims and its range of equivalence.

Constituent elements of the ultrasonic flaw detecting apparatus can be achieved by a processor of a computer, and can be operated by an ultrasonic flaw detecting program.

The ultrasonic flaw detecting apparatus described above includes: a control device; an external storing device; a display device, such as a display; an input device, such as a mouse and a keyboard; and a communication I/F. In the control device, a processor, such as a dedicated chip, FPGA (Field Programmable Gate Array), GPU (Graphics Processing Unit), or CPU (Central Processing Unit), is highly integrated. The storing device may be ROM (Read Only Memory), RAM (Random Access Memory) or the like. The external storing device may be a HDD (Hard Disk Drive), an SSD (Solid State Drive) or the like. This apparatus can be implemented by a hardware configuration through use of a typical computer.

The program executed in the ultrasonic flaw detecting apparatus is preliminarily implemented in an ROM or the like and provided. Alternatively, the program may be stored in a computer-readable storing medium in an installable or executable form. This medium may be a CD-ROM, CD-R, memory card, DVD, flexible disk (FD) or the like.

The program executed in the ultrasonic flaw detecting apparatus according to this embodiment may be stored in a computer connected to a network, such as the Internet, downloaded via the network and provided.

What is claimed is:

1. An ultrasonic flaw detecting apparatus comprising:
    an array probe comprising a plurality of piezoelectric elements, each of the plurality of piezoelectric elements being configured to transmit and receive an ultrasonic wave to and from an inspection object;
    an element-group defining circuit configured to
        select, as an element group, plural consecutive piezoelectric elements from the plurality of piezoelectric elements,
        set a reference position of the element group based on array arrangement information of the plurality of piezoelectric elements in the element group and based on a weighting value of each of the plurality of piezoelectric elements in the element group, and
        calculate a propagation path of an ultrasonic beam from the element group based on the reference position and a predetermined refraction angle;
    a calculator configured to calculate a delay time of each of the plurality of piezoelectric elements in the element group in such a manner that the ultrasonic beam is configured to propagate along the propagation path;
    a signal receiver configured to receive respective ultrasonic waves received with the plurality of piezoelectric elements as detection signals; and
    a generator configured to generate at least one composite signal for the ultrasonic beam having the propagation path based on the detection signals reflecting the weighting value and the delay time, the detection signals in which transmission output of each piezoelectric elements or reception gain of each piezoelectric elements is adjusted by the weighting value.

2. The ultrasonic flaw detecting apparatus according to claim 1,
    wherein either a total or an average value of the respective weighting values of the plurality of piezoelectric elements in the element group is set within a predetermined range.

3. The ultrasonic flaw detecting apparatus according to claim 1,
    the generator is configured to
        generate a first composite signal based on the detection signals and the time delay where number of the plural consecutive piezoelectric elements is a first predetermined number; and
        generate a second composite signal based on the detection signals and the time delay where the number of the plural consecutive piezoelectric elements constituting the element group is a second predetermined number larger than the first predetermined number.

4. An ultrasonic flaw detecting method comprising:
selecting plural consecutive piezoelectric elements, which are selected from a plurality of piezoelectric elements constituting an array probe, as an element group;
setting a weighting value for each of the plurality of piezoelectric elements in the element group;
setting a reference position of the element group based on the weighting value and the array arrangement information of the plurality of piezoelectric elements in the element group;
calculating a propagation path of an ultrasonic beam from the element group based on the reference position and a predetermined refraction angle;
calculating a delay time of each of the plurality of piezoelectric elements in the element group in such a manner that the ultrasonic beam is configured to propagate along the propagation path;
receiving respective ultrasonic waves transmitted from an inspection object and received with the plurality of piezoelectric elements as detection signals; and
generating at least one composite signal for the ultrasonic beam having the propagation path based on the detected signals and the delay time, the detection signals in which transmission output of each piezoelectric elements or reception gain of each piezoelectric elements is adjusted by the weighting value.

5. The ultrasonic flaw detecting method according to claim 4,
wherein either a total or an average value of the respective weighting values of the plurality of piezoelectric elements in the element group is within a predetermined range.

6. The ultrasonic flaw detecting method according to claim 4,
wherein the at least one composite signal comprises a first composite signal and a second composite signal;
the first composite signal is generated based on the detection signals and the time delay where number of the plural consecutive piezoelectric elements is a first predetermined number; and
the second composite signal is generated based on the detection signals and the time delay where number of the plural consecutive piezoelectric elements is a second predetermined number larger than the first predetermined number.

7. A manufacturing method of a product comprising:
preparing a structure;
performing the ultrasonic flaw detection method according to claim 4 on the structure as the inspection object;
completing the structure, on which the ultrasonic flaw detecting method is performed, as the product.

* * * * *